UNITED STATES PATENT OFFICE.

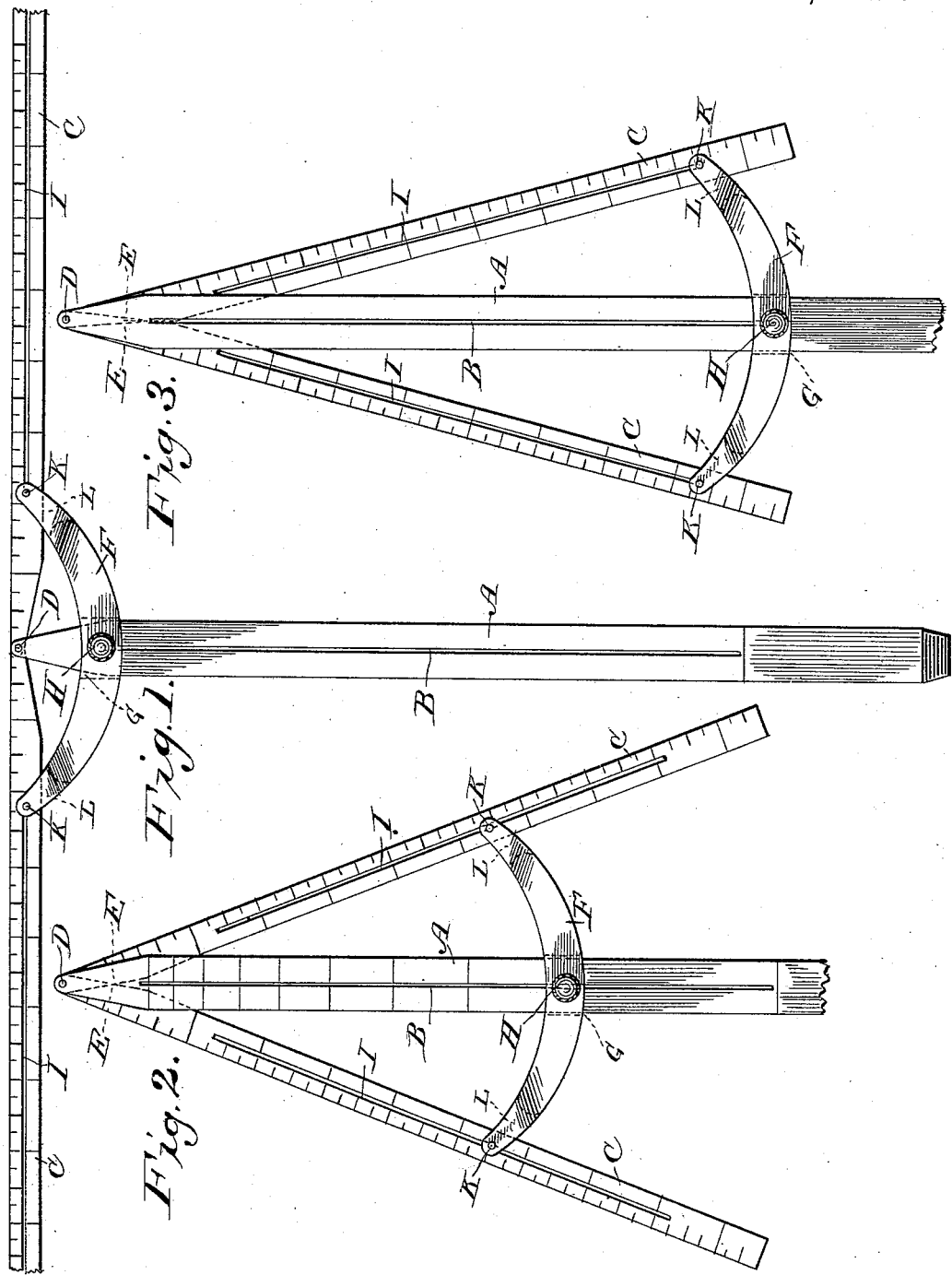

GEORGE M. REDWAY, OF ASBURY PARK, NEW JERSEY.

BEVEL.

SPECIFICATION forming part of Letters Patent No. 443,539, dated December 30, 1890.

Application filed April 10, 1890. Serial No. 347,402. (No model.)

*To all whom it may concern:*

Be it known that I, GEORGE M. REDWAY, of Asbury Park, in the county of Monmouth and State of New Jersey, have invented a certain new and useful Improvement in Miter-Gages, of which the following is a specification, reference being had to the accompanying drawings.

The object of my invention is to provide a convenient miter-gage for corners or bevels of all descriptions, one that can be quickly applied, that is simple in construction, that will not be likely to get out of order, and that is adapted for many uses.

My invention consists in the construction and organization of parts hereinafter specified, and succinctly stated in my appended claims.

In the accompanying drawings, Figure 1 is a side view of my gage with the wings in a straight line. Fig. 2 shows the wings set at a certain angle, and Fig. 3 shows them set at another.

A indicates a central guide and handle pointed, as shown in the drawings, at one end and provided with a central longitudinal guide-slot B. This handle may be graduated as usual, so as to indicate the angles formed by the wings C C. These wings are also pointed and pivoted at D to the pointed end of the handle, and are adapted to enter slots E E in opposite sides of the pointed end of the handle, when they are closed, as indicated in Fig. 3. The wings may also be graduated.

F indicates a cross-piece slotted at G to receive the handle, and provided with a setscrew H for holding it in any desired position upon the handle.

I I indicate longitudinal slots in the wings, through which pass pins K in the ends of the cross-piece.

L L indicate slots in the ends of the cross-piece to receive the edges of the wings. By sliding the cross-piece to different positions upon the handle the wings may be spread out to form any desired angle with respect to the handle or with respect to each other, the pins K moving along in slots L.

The handle and wings can be made of sheet metal, so as to render the instrument light and cheap.

Being pointed at the end, this miter-gage can be placed close in corners, which is often desirable.

What I claim is—

1. The combination of the longitudinally-slotted wings pivoted to the pointed handle, the sliding cross-piece engaging by means of pins in the slots of the wings, and the setscrew for fastening the cross-piece in any desired position on the handle, substantially as set forth.

2. In a miter-gage, the combination of the pointed handle A, slotted at E, the longitudinally-slotted wings C, pivoted to the pointed handle, and the cross-piece engaging with the wings by means of pins which slide in their slots and with the handle, substantially as set forth.

In testimony of all which I have hereunto subscribed my name.

GEORGE M. REDWAY.

Witnesses:
 JOS. H. FORCE,
 W. C. BURROUGHS.